(12) United States Patent
Sykes et al.

(10) Patent No.: US 9,707,838 B2
(45) Date of Patent: Jul. 18, 2017

(54) POWERTRAIN HOUSING ASSEMBLY

(71) Applicant: FORD GLOBAL TECHNOLOGIES, LLC, Dearborn, MI (US)

(72) Inventors: Matt Sykes, Wickford (GB); Sasan Dadgostar, Billericay (GB); Andrew Cleland, Chelmsford (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/666,457

(22) Filed: Mar. 24, 2015

(65) Prior Publication Data

US 2015/0283891 A1    Oct. 8, 2015

(30) Foreign Application Priority Data

Apr. 4, 2014 (GB) .................................. 1406106.3

(51) Int. Cl.

| | |
|---|---|
| *B60K 5/04* | (2006.01) |
| *B60K 5/12* | (2006.01) |
| *B60K 17/344* | (2006.01) |
| *F16H 57/025* | (2012.01) |
| *B60K 17/08* | (2006.01) |

(52) U.S. Cl.
CPC .......... *B60K 5/1241* (2013.01); *B60K 17/344* (2013.01); *B60K 5/04* (2013.01); *B60K 17/08* (2013.01); *B60Y 2410/10* (2013.01); *F16H 57/025* (2013.01)

(58) Field of Classification Search
CPC .. B60K 5/1208; B60K 5/1225; B60K 5/1241; Y10T 74/2186
See application file for complete search history.

(56) References Cited

U.S. PATENT DOCUMENTS

| 2,028,549 | A | * | 1/1936 | Lord | .................... | B60K 5/1241 |
|---|---|---|---|---|---|---|
| | | | | | | 248/589 |
| 2,184,669 | A | * | 12/1939 | Hansen | ................. | F16H 57/022 |
| | | | | | | 74/606 R |
| 4,324,306 | A | | 4/1982 | Ishihara et al. | | |
| 4,497,285 | A | * | 2/1985 | Kondo | ..................... | F01P 1/06 |
| | | | | | | 123/195 C |
| 8,215,444 | B2 | | 7/2012 | Fsadni | | |

FOREIGN PATENT DOCUMENTS

| FR | 2861337 A1 | 4/2005 |
|---|---|---|
| FR | 2946715 A1 | 12/2010 |
| GB | 2109320 A | 6/1983 |

\* cited by examiner

*Primary Examiner* — Bryan Evans
(74) *Attorney, Agent, or Firm* — James Dottavio; MacMillan, Sobanski & Todd, LLC

(57) ABSTRACT

A powertrain housing assembly (200) for a vehicle powertrain has a powertrain housing (210) configured to house at least a portion of the vehicle powertrain (10). A mount (230) is configured to directly receive a torque roll restrictor (120) for attaching the powertrain housing to a vehicle sub-frame, wherein the mount is integral with the powertrain housing and the mount is configured to movably receive the torque roll restrictor such that the torque roll restrictor is movable relative to the mount during use.

15 Claims, 3 Drawing Sheets

POWERTRAIN HOUSING ASSEMBLY

CROSS REFERENCE TO RELATED APPLICATIONS

This application claims priority to application GB 1406106.3, filed in the United Kingdom Intellectual Property Office on Apr. 4, 2014, which is hereby incorporated by reference in its entirety.

STATEMENT REGARDING FEDERALLY SPONSORED RESEARCH

Not Applicable.

BACKGROUND OF THE INVENTION

The present invention relates in general to a powertrain housing and in particular to a powertrain housing configured to receive a torque roll restrictor or torque rod.

Automotive powertrains, which may comprise an engine and transaxle, utilize powertrain torque roll restrictors or torque rods to prevent unwanted rotation of the engine and transaxle about an axis which, if not coincidental with the engine's crankshaft centre axis, is at least parallel thereto. Known automotive powertrain roll restrictors utilize brackets for attaching the restrictor to the transaxle or engine.

In this regard, FIG. 1 shows a roll restrictor system for an automotive powertrain 10, which was previously disclosed in U.S. Pat. No. 8,215,444, which is incorporated herein by reference. The powertrain 10 has an engine 14 and a transaxle 18 with a longitudinal center line A. The powertrain 10 also includes a roll restriction system. The transaxle 18 includes a first mounting pad 22 to which a mounting bracket 26 is attached. A control link 42 connects bracket 26 to a vehicle structural member 46.

A powertrain torque roll restrictor has many functions. It needs to simultaneously isolate engine excitation forces at both idle (small force preloads) and wide open throttle (large force preloads), whilst controlling powertrain roll during highly transient dynamic events. These conflicting requirements require a part that allows sufficient displacement with a low rate of change of stiffness.

As depicted in FIG. 2, a previously-proposed powertrain torque roll restrictor 120 may comprise a core 143 that is attached to a vehicle sub-frame, e.g. via a link bolt 142; and a housing 144 that is resiliently coupled to the core 143. The housing 144 is in turn connected to a mounting bracket 126 via a bolt 128. The mounting bracket 126 is bolted to the transmission clutch housing 118 via two or more further bolts 130, 132.

However, because of package constraints, it is difficult to arrange the joint between the mounting bracket 126 and the transmission clutch housing 118 in an orientation which allows the bolts 130, 132 to work in tension in one plane. Accordingly, the bolts 130, 132 are often in two planes with at least one of the bolts 130, 132 working in shear. The combination of the shear loads and the clamp loss due to gap tolerances created by the two planes can lead to joint slip and joint relaxation when subjected to the high dynamic loads resulting in torque loss and the failure of the joint.

SUMMARY OF THE INVENTION

According to a first aspect of the present disclosure there is provided a powertrain housing assembly for a vehicle powertrain. The powertrain housing assembly comprises a powertrain housing configured to house at least a portion of the vehicle powertrain, and a mount configured to directly receive a torque roll restrictor for attaching the powertrain housing to a vehicle sub-frame. The mount is integral, e.g., unitary, with the powertrain housing and the mount is configured to movably receive the torque roll restrictor such that the torque roll restrictor is movable relative to the mount during use.

The mount may comprise an opening, e.g., for receiving the torque roll restrictor. The opening may be configured to receive a resilient element. The resilient element may be disposed between the mount and the torque roll restrictor. The powertrain housing assembly may comprise the resilient element. The resilient element may be provided in the opening. The opening may comprise a bore with a central axis. The bore central axis may be substantially parallel to a crank shaft axis of the vehicle powertrain.

The mount may comprise a protrusion protruding from the powertrain housing. The protrusion may be integral with the powertrain housing. The protrusion may extend in a direction substantially perpendicular to a crank shaft axis of the vehicle powertrain. The protrusion may be configured such that the torque roll restrictor connects to the mount either side of the protrusion.

The powertrain housing assembly may be configured such that there is a single connection point between the powertrain housing assembly and the torque roll restrictor.

The mount may be configured to rotatably receive the torque roll restrictor such that the torque roll restrictor may be rotatable in the mount.

The torque roll restrictor may comprise: a first element connectable to the mount, e.g., at a first point or end of the first element; a second element connectable to the vehicle sub-frame, e.g., at a first point or end of the second element; and a resilient element. The first and second elements may be connected to the resilient element, e.g., at second points or ends of the first and second elements. The powertrain housing assembly may further comprise the torque roll restrictor.

DETAILED DESCRIPTION OF PREFERRED EMBODIMENTS

Figure 1:
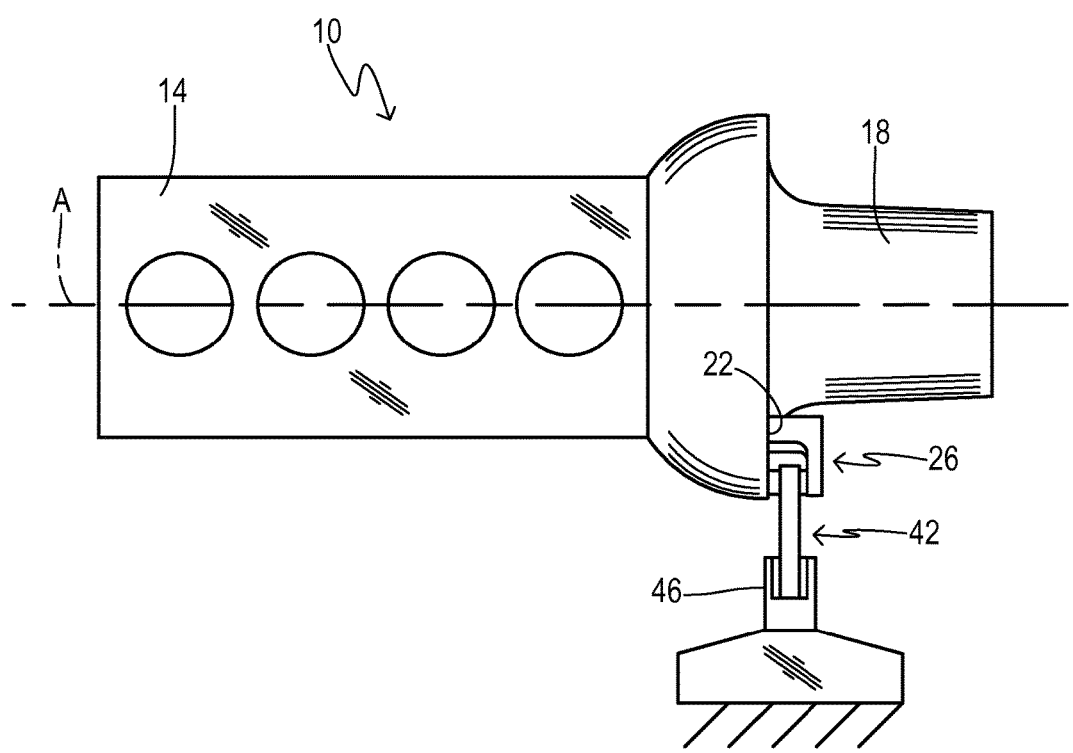
FIG. 1 is a schematic representation of a known automotive powertrain having a roll restrictor system.
Figure 2:
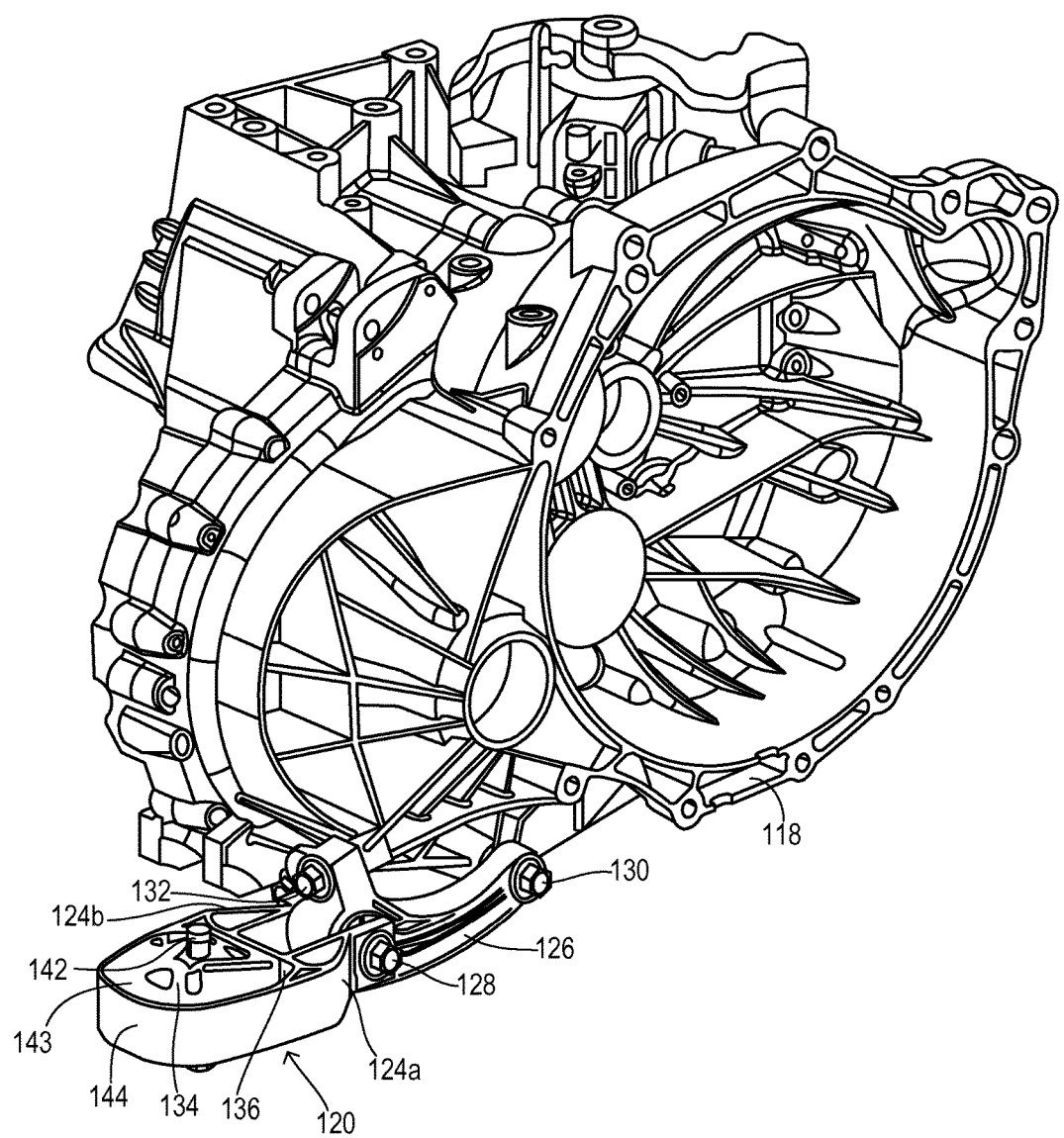
FIG. 2 is a perspective view of a previously-proposed powertrain housing and powertrain torque roll restrictor arrangement.
Figure 3:
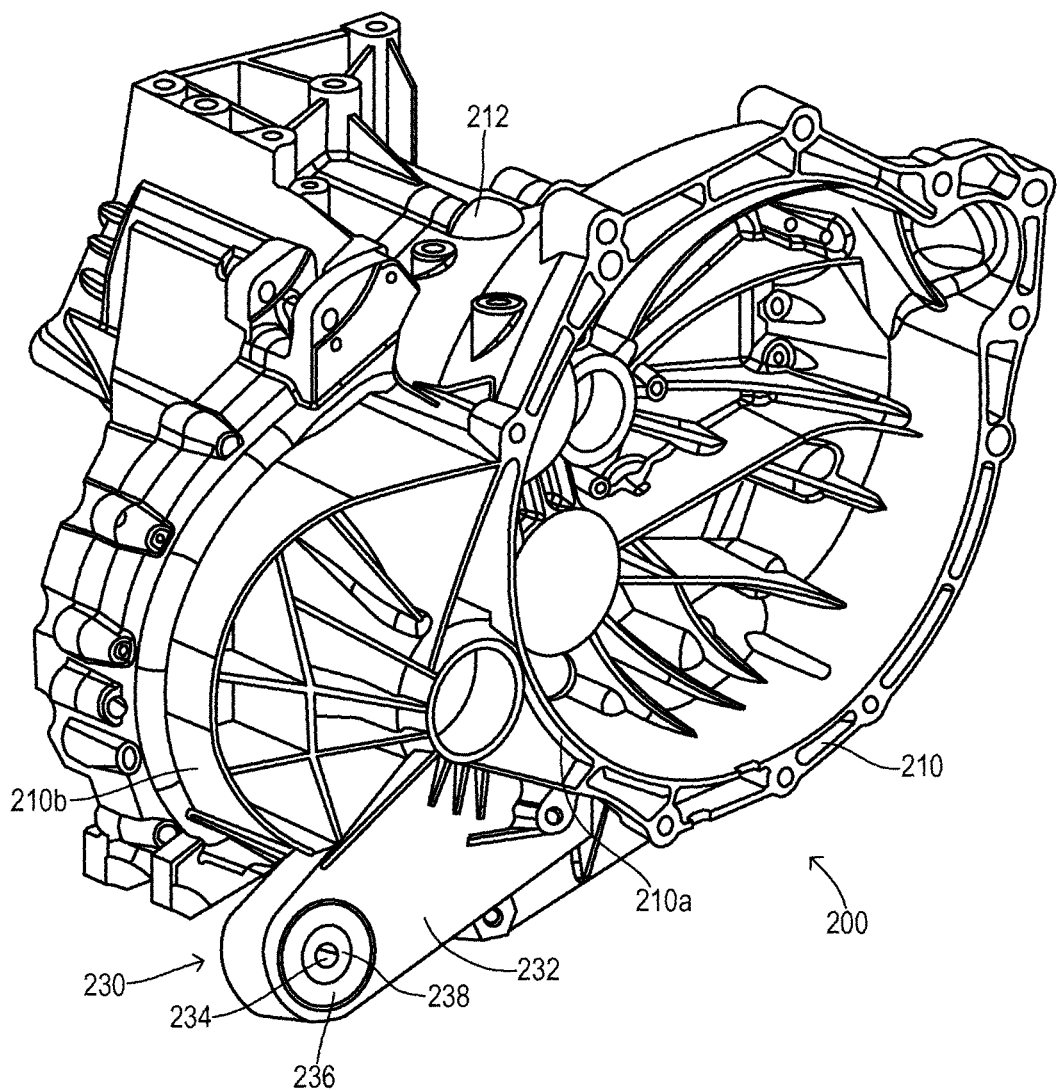
FIG. 3 is a perspective view of the powertrain housing assembly according to the present disclosure.

With reference to FIG. 3, the present disclosure relates to a powertrain housing assembly 200 for a vehicle powertrain. The powertrain housing assembly 200 comprises a powertrain housing 210 which is configured to house at least a portion of the vehicle powertrain. The powertrain housing 210 is connected to a vehicle structure, such as a sub-frame, via a torque rod or torque roll restrictor 120, which although not shown in FIG. 3, is depicted in FIG. 2.

The powertrain may comprise one or more of an engine, clutch, transmission, differential, transaxle or other associated components. The powertrain housing 210 may house one or more of these powertrain components. In the particular example shown, the powertrain housing 210 at least partially covers the clutch (not shown) and may also be part of a transmission housing 212.

The powertrain housing assembly 200 further comprises a mount 230. The mount 230 is configured to directly receive the torque roll restrictor 120. The mount 230 is integral, e.g. unitary, with the powertrain housing 210. For example, the powertrain housing 210 and mount 230 may be from the same casting such that they form a single piece casting.

The mount 230 may comprise a protrusion 232 which may protrude from the powertrain housing 210. The protrusion 232 may be substantially elongate. The protrusion 232 may extend from a clutch housing portion 210a of the powertrain housing 210. The clutch housing portion 210a may at least partially cover the clutch. In addition, the protrusion 232 may extend across an end of a transmission output shaft housing portion 210b. The transmission output shaft housing portion 210b may at least partially cover and/or support an output shaft of the transmission. The protrusion 232 may preferably extend in a direction substantially perpendicular to a crank shaft axis and/or output shaft axis of the vehicle powertrain.

The protrusion 232 may be integral with the powertrain housing 210, in particular, the protrusion 232 may be integral with the clutch housing portion 210a and the transmission output shaft housing portion 210b. The clutch housing portion 210a and the transmission output shaft housing portion 210b may also be integral with one another. Extending across and being integral with the end of the transmission output shaft housing portion 210b may add structural rigidity to the protrusion 232. The protrusion 232 may comprise an opening 234 for receiving the torque roll restrictor 120, in particular the bolt 128 which is provided at the end of the housing 144. The opening 234 may be provided at or towards an end of the protrusion 232. The opening may comprise a bore with a central axis. The bore central axis may be substantially parallel to a crank shaft axis and/or output shaft axis of the vehicle powertrain. The bore may extend all the way through the protrusion 232. Alternatively, the bore may be a blind bore that extends only part way through the protrusion 232.

The mount 230 may be configured to movably receive the torque roll restrictor 120 such that the torque roll restrictor is movable relative to the mount during use. For example, the torque roll restrictor 120 may be rotatable relative to the mount 230. Furthermore, there may be only one connection point between the powertrain housing assembly 200 and the torque roll restrictor 120. The sole connection point may be at the opening 234 in the protrusion 232.

The protrusion 232 may be configured such that the torque roll restrictor 120 connects to the mount either side of the protrusion. In particular, the housing 144 of the torque roll restrictor 120 (shown in FIG. 2) may comprise a pair of opposing arms 124a, 124b. The opposing arms 124a, 124b define a space therebetween, which may accommodate the protrusion 232 with the bolt 128 extending across the space. The opposing arms 124a, 124b may comprise respective openings, which are aligned to receive the bolt 128.

A resilient element 236 may be provided in the opening 234. The resilient element 236 may be in the form of a circular sleeve which is sized to fit in the bore of the opening 234. The resilient element 236 may be provided between the mount 230 and the torque roll restrictor 120 so as to provide further resilience in the connection between the powertrain and vehicle sub-frame.

In addition to the resilient element 236, an inner circular sleeve or collar 238 may be provided in the opening 234 to receive the bolt 128. The collar 238 may be provided inside the resilient element 236. The collar 238 may be rotatably fixed relative to the bolt 128. For example, an inner surface of the collar 238 may be threaded to receive threads of bolt 128 and/or the collar 238 may be sized to be clamped between opposing arms 124a, 124b of the torque roll restrictor housing 144. To permit clamping of the collar 238, the axial length of collar 238 may be greater than a corresponding width of the protrusion 232.

The resilient element 236 may be bonded to protrusion 232 within protrusion opening 234 and/or to collar 238. An interference fit may otherwise be provided between the resilient element 236 and the protrusion opening 234 and/or collar 238. In either case, an outer surface of the resilient element 236 may be substantially fixed relative to the protrusion opening 234, and an inner surface of the resilient element 236 may be substantially fixed relative (e.g., bonded) to the collar 238. Relative rotation between the torque roll restrictor 120 and the mount 230 may thus occur by virtue of the resilient element 236 twisting, although in the case of interference fits some sliding between the components may occur. Accordingly, the resilient element 236 may be made from a hard wearing resilient material, such as rubber. Similarly, the collar 238 and/or mount 230 may be made from a hard wearing material, such as a metal.

The torque roll restrictor 120 shown in FIG. 2 may connect to the powertrain housing assembly 200 of the present disclosure. The torque roll restrictor 120 may comprise a first element, such as housing 144, which is connectable to the mount 230. The torque roll restrictor 120 may comprise a second element, such as core 143, which is connectable to the vehicle sub-frame, e.g. via a link bolt 142. The torque roll restrictor 120 may further comprise one or more resilient elements 134. The first and second elements may both be connected to the resilient elements 134.

The core 143 may be provided within a recess 136 defined by the housing 144. The resilient elements 134 may be provided between the housing 144 and the core 143. For example, the resilient elements 134 may be placed in the housing recess 136. The housing 144 and/or core 143 may be coupled, e.g., bonded, to one or more of the resilient elements 134. As the powertrain torque varies, the powertrain may move relative to the rest of the vehicle and the housing 144 may move relative to the core 143. Other arrangements for the torque roll restrictor with first and second elements and one or more intermediate resilient elements are also envisaged.

Although the protrusion 232 is shown and described as having an opening 234 for receiving bolt 128 of torque roll restrictor 120, it is also envisaged that the opening 234 may receive a stud, shaft or spindle associated with the torque roll restrictor 120. Furthermore, it is also envisaged that instead of opening 234, the protrusion 232 may alternatively comprise a shaft or spindle, which is received in a corresponding opening in the torque roll restrictor.

It will be appreciated by those skilled in the art that although the invention has been described by way of example with reference to one or more examples, it is not limited to the disclosed examples and that alternative examples could be constructed without departing from the scope of the invention as defined by the appended claims.

What is claimed is:
1. A powertrain housing assembly for a vehicle powertrain in a vehicle having a sub-frame, wherein the powertrain defines a shaft axis, comprising:
a powertrain housing configured to house at least a portion of the vehicle powertrain, wherein the pow- ertrain housing includes a transmission output shaft housing portion covering an output shaft of a transmission;

a torque roll restrictor with first and second ends; and a first resilient element;

wherein the powertrain housing includes a mounting protrusion integrally formed with the housing, and wherein the protrusion has an opening extending through the protrusion in a direction parallel with the shaft axis;

wherein the first resilient element is retained in the opening;

wherein the first end of the torque roll restrictor is attached to the first resilient element and the second end of the torque roll restrictor is attached to the vehicle sub-frame such that the torque roll restrictor and powertrain housing are relatively movable by twisting of the first resilient element during use;

wherein the powertrain housing and mounting protrusion are a unitary casting; and wherein the protrusion extends across an end of the transmission output shaft housing portion.

2. The powertrain housing assembly of claim 1 wherein the protrusion extends in a direction substantially perpendicular to the shaft axis.

3. The powertrain housing assembly of claim 1 wherein the torque roll restrictor is rotatable in the opening.

4. The powertrain housing assembly of claim 1 wherein the first resilient element is comprised of a circular sleeve bonded within the opening.

5. The powertrain housing assembly of claim 1 wherein the first resilient element is comprised of a circular sleeve retained within the opening by an interference fit.

6. The powertrain housing assembly of claim 1 wherein the first resilient element is comprised of rubber.

7. The powertrain housing assembly of claim 1 further comprising an inner sleeve retained within the first resilient element for affixing to the first end of the torque roll restrictor.

8. The powertrain housing assembly of claim 7 wherein the first resilient element is comprised of a circular rubber sleeve bonded within the opening, wherein the inner sleeve is comprised of a metal collar fixed inside the rubber sleeve, and wherein the inner sleeve receives a bolt for attaching the first end of the torque roll restrictor with the first resilient element.

9. The powertrain housing assembly of claim 1 wherein the torque roll restrictor is comprised of opposing arms defining a space for receiving the mounting protrusion.

10. The powertrain housing assembly of claim 1 wherein the second end of the torque roll restrictor is comprised of:

a housing;

a core;

a second resilient element coupling the housing and the core;

wherein the core is configured to connect to the vehicle sub-frame.

11. A powertrain housing assembly for a vehicle powertrain in a vehicle having a sub-frame, wherein the powertrain defines a shaft axis, comprising:

a powertrain housing configured to house at least a portion of the vehicle powertrain, wherein the powertrain housing includes a transmission output shaft housing portion covering an output shaft of a transmission;

a torque roll restrictor with first and second ends; and a first resilient element;

wherein the powertrain housing includes a mounting protrusion integrally formed with the housing, and wherein the protrusion has an opening extending through the protrusion in a direction parallel with the shaft axis;

wherein the first resilient element is retained in the opening;

wherein the first end of the torque roll restrictor is attached to the first resilient element and the second end of the torque roll restrictor is attached to the vehicle sub-frame such that the torque roll restrictor and powertrain housing are relatively movable by twisting of the first resilient element during use; and wherein the protrusion extends across an end of the transmission output shaft housing portion.

12. The powertrain housing assembly of claim 11 wherein the protrusion is integral with the transmission output shaft housing.

13. The powertrain housing assembly of claim 11 further comprising:

a clutch housing portion, wherein the protrusion is further integral with the clutch housing portion.

14. The powertrain housing assembly of claim 1 wherein the mounting protrusion extends across the output shaft of the transmission.

15. The powertrain housing assembly of claim 14 wherein the clutch housing portion is further integral with the transmission output shaft housing.

\* \* \* \* \*